United States Patent [19]

Hoch

[11] 4,133,165

[45] Jan. 9, 1979

[54] FORAGE HARVESTER THROAT SHEETS

[75] Inventor: Manfried L. Hoch, Romeoville, Ill.

[73] Assignee: International Harvester Company, Chicago, Ill.

[21] Appl. No.: 807,708

[22] Filed: Jun. 17, 1977

[51] Int. Cl.² ............................................. A01D 89/00
[52] U.S. Cl. ......................................... 56/2; 56/14.3; 56/DIG. 1; 56/DIG. 9
[58] Field of Search ................ 56/364, 2, 15.8, 13.9, 56/DIG. 1, DIG. 9, 15.9, 14.3, 14.4, 15.6

[56] References Cited

U.S. PATENT DOCUMENTS

| | | | |
|---|---|---|---|
| 3,412,534 | 11/1968 | Teale | 56/2 |
| 4,067,176 | 1/1978 | Hoch et al. | 56/2 |

*Primary Examiner*—Jay N. Eskovitz
*Attorney, Agent, or Firm*—Dennis K. Sullivan; Neal C. Johnson; F. David AuBuchon

[57] ABSTRACT

A forage harvester including a basic processing unit of the type having a cutterhead, a plurality of opposed crop infeed rolls disposed forwardly thereof and a feed roll housing having transversely spaced side walls and a forward opening, and a pair of throat sheet members mounted on the basic processing unit for swinging relative to the housing and disposed adjacent the opening on each side, the sheets extending laterally outwardly from inner rearwardly turned ends inwardly adjacent the side walls to outward ends spaced from the sidewalls; and a crop feeding unit detachably mounted for vertical articulation to said basic unit and having a rear opening in confronting relationship to the sheets such that the sheets close off the portion of the discharge opening external of the feed throat.

4 Claims, 4 Drawing Figures

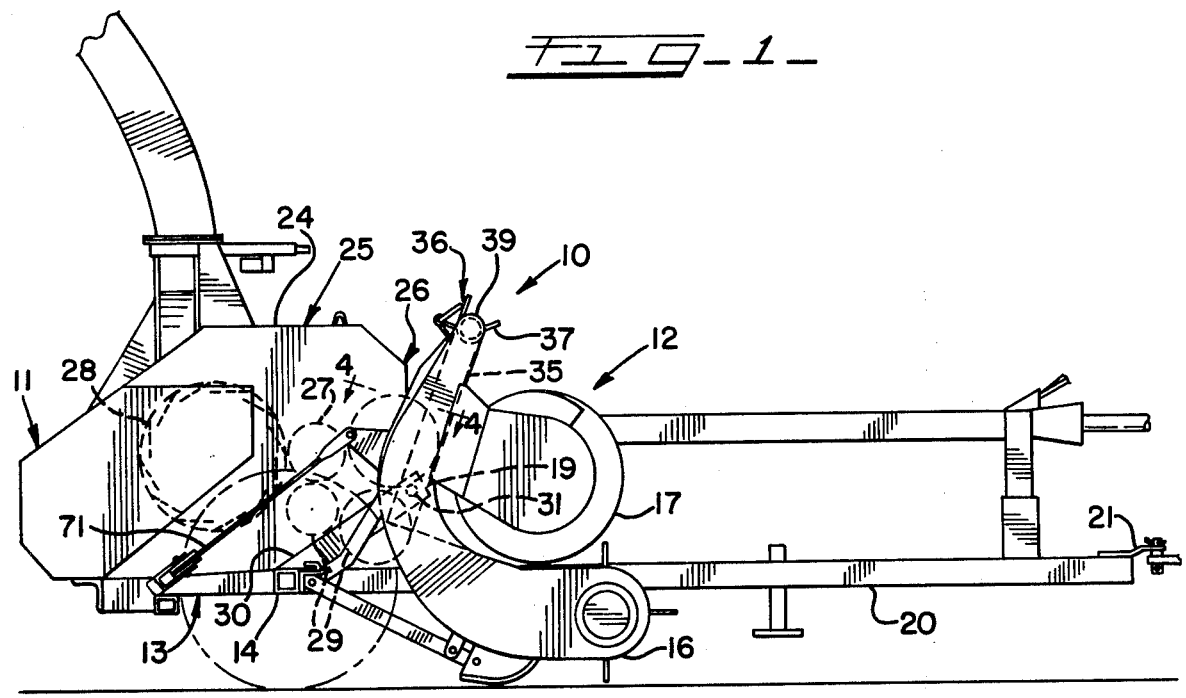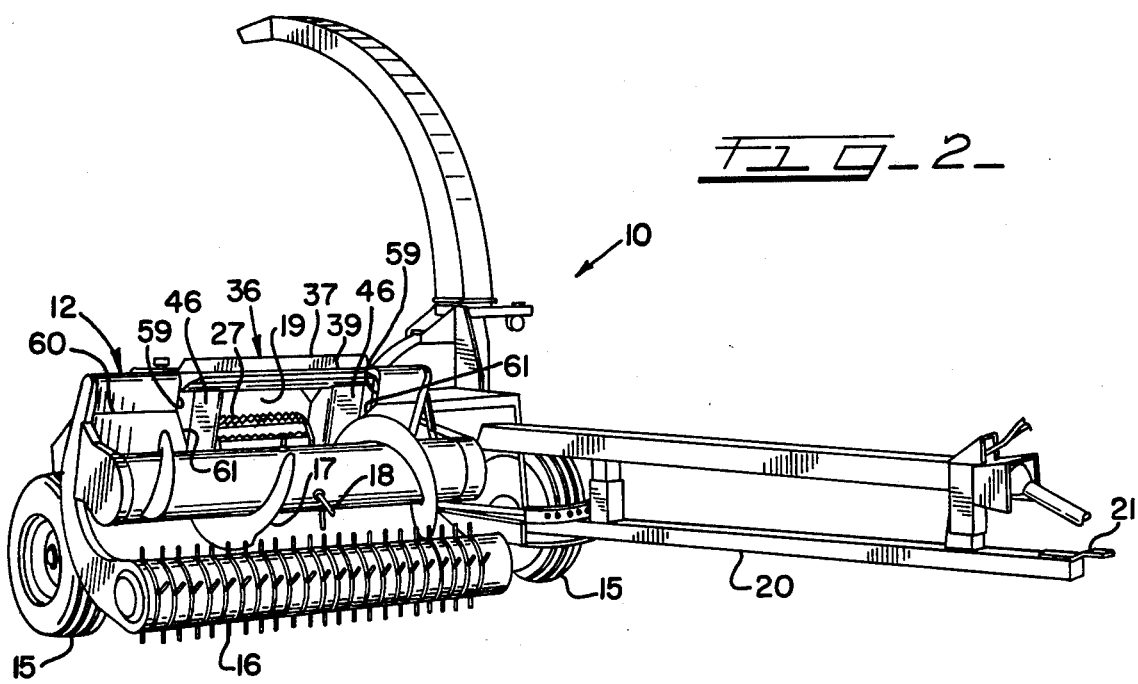

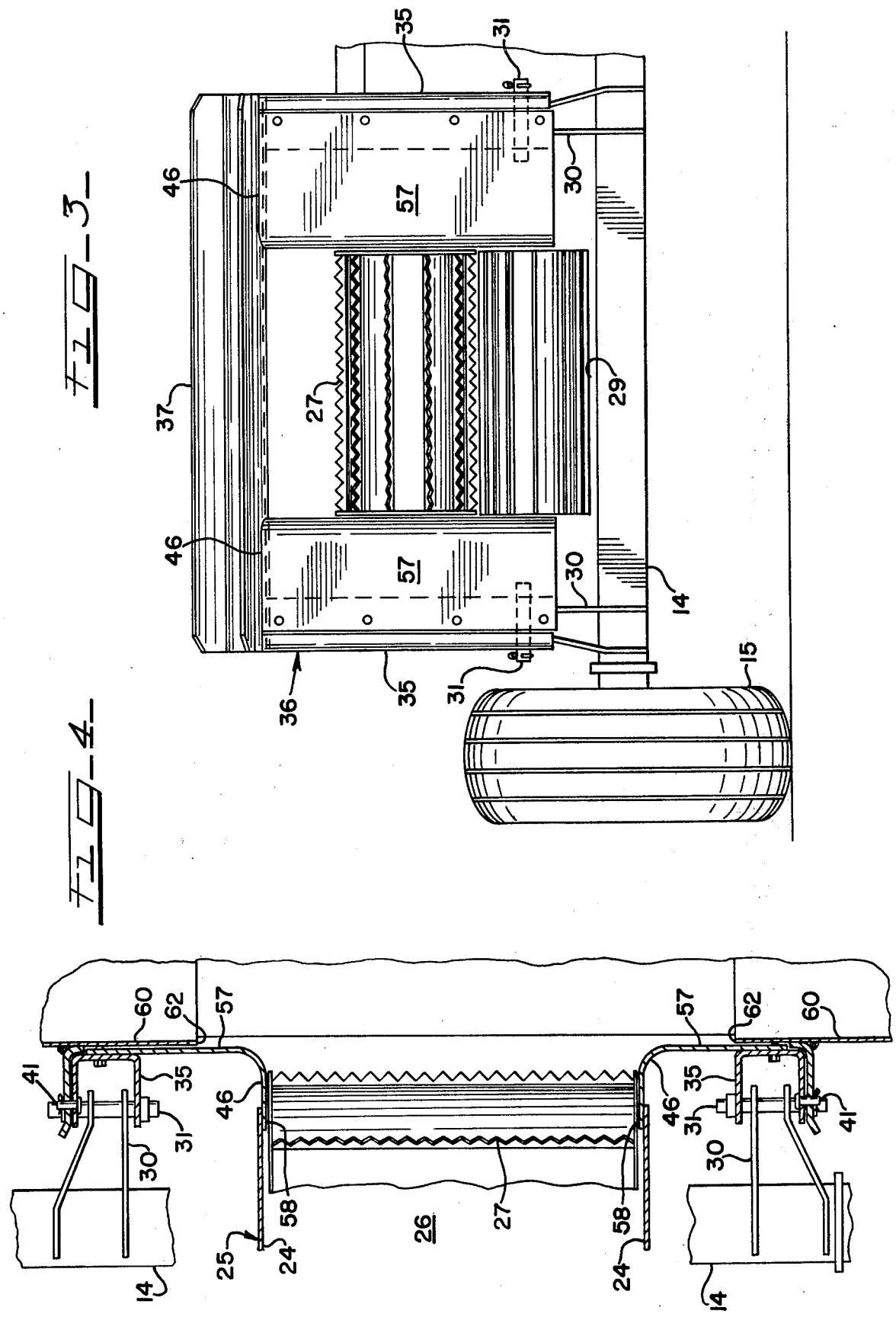

4,133,165

FORAGE HARVESTER THROAT SHEETS

CROSS REFERANCE TO RELATED APPLICATION

This application is related to application Serial No. 698,372 filed June 21, 1976, now U.S. Pat. No. 4,067,176 by Manfried L. Hoch, Edward A. Fritz, and Peter Sammarco and assigned to the Assignee hereof.

BACKGROUND OF THE INVENTION

This invention is related to forage harvesters of the type having a basic processing unit and one of a number of crop feeding units, such as hay pickup units and row crop harvesting and gathering units of various configurations, detachably mounted forwardly thereof and, more particularly, to a novel throat sheet apparatus at the interface therebetween.

A forage harvester basic processing unit usually includes a rotary reel cutterhead, a plurality of opposed crop infeed rolls disposed forwardly thereof, the rolls defining a crop infeed passage therebetween to the cutterhead, and a feed roll housing opening forwardly so that the rolls may receive crops from the crop feeding unit. The crop feeding units generally articulate vertically relative to the basic unit and to this end is pivotally mounted thereto about a transverse pivot axis located adjacent the nip of the feed rolls.

Heretofore, manufacturers provided side shields which form a rearward extension of the rear discharge outlet of the crop feeding units and slide into the feed roll housing between the feed rolls and the housing side sheets to prevent material from escaping sideways to the gap between the basic unit and crop feeding unit which occurs upon articulation therebetween. Sliding the side shields into the housing can create some alignment difficulty in installing a crop feeding unit on the basic unit.

Additionally, it is not uncommon for a forage harvester to be produced in a family of different capacities by varying the width of the cutterhead and infeed rolls, as well as their housings, while retaining the rest of the structure except for increased drive capacity. However, in varying the width, either a means of varying the discharge openings of the crop feeding units is necessary to match the increased width of the feed throat or a new series of crop units must be provided.

Others have tried to solve the latter problem in a hay pickup using laterally slidable members on the back sheet of the pickup to vary the width of the discharge opening, the side sheets forming a rearward extension of these members. Aside from the adjustments and alignment difficulties involved, this only partially solves the problem since each crop feeding unit would require similar sliding members at added expense.

SUMMARY OF THE INVENTION

Accordingly, it is an object of the invention described and claimed herein to provide a forage harvester wherein the side shields are mounted on and stay with the basic processing unit, thereby requiring no alignment adjustments when a crop feeding unit is installed.

A further object of the invention is to provide a forage harvester wherein a crop feeding unit with a wider discharge opening than the opening of the basic unit feed roll housing may be utilized.

These and other objects of the invention are specifically met in a forage harvester of the type described wherein a pair of throat sheets are mounted to the basic unit and disposed adjacent the crop infeed opening respectively on each side thereof. The sheets extend laterally outwardly from rearwardly turned ends adjacent the side walls of the feed roll housing to laterally outward edges spaced from said side walls and have an upward extent at least equal to the crop feeding passage between the rolls. A crop feeding unit is detachably mounted to the basic unit forwardly thereof in confronting relationship to the throat sheets such that the sheets close off the portion of the crop feeding unit discharge opening laterally external of the housing opening. Preferably, the outer edges of the throat sheets are mounted respectively to the transversely spaced legs of a crop unit attaching yoke pivotally mounted to the basic unit and adjacent the forward end of the feed roll housing for fore-and-aft swinging movement so that the throat sheets move with the gathering unit relative to the infeed housing.

One advantage of the above-described invention is that a crop feeding unit designed for use with a wide throat basic processing unit can be used with a narrow throat basic processing unit. This is especially advantageous in the case of hay pickup units wherein no modifications need be made to either the basic unit or the hay pickup unit. In the case of a row crop harvesting and gathering unit, it may still be necessary to add small deflectors to the crop feeding unit to prevent stalk butts, especially those disengaged from the gathering belts, from pinching between the feed rolls and the throat sheets. These deflectors would be forward of the interface between the units so as not to interfere with the throat sheets.

Another advantage of the present invention is that the rearwardly turned inner ends of the throat sheets close the side gaps between the basic processing unit and the crop feeding unit above the pivot point therebetween, thus preventing crops from escaping in this area. Since the location of the throat sheets relative to the basic unit does not change, there is no problem of aligning side sheets with the feed roll housing when attaching a crop feeding unit.

DETAILED DESCRIPTION OF THE DRAWINGS

Other objects and advantages of the invention will become apparent upon reading the detailed description of the preferred embodiment and upon reference to the drawings in which:

FIG. 1 is a side view of a forage harvester incorporating the present invention.

FIG. 2 is a front perspective view of the forage harvester of FIG. 1 including a hay pickup crop feeding unit attached thereto.

FIG. 3 is a front view of the right side of the basic processing unit of FIG. 1 without the crop feeding unit attached; and, FIG. 4 is a partial sectional view of the interface between the crop feeding unit and the basic processing unit as viewed along the line 4—4 of FIG. 1.

DETAILED DESCRIPTION OF THE PREFERRED EMBODIMENT

Referring now to FIGS. 1 through 3, there is shown a forage harvester generally designated 10 including a basic processing unit generally designated 11 and a hay pickup crop feeding unit generally designated 12 attached thereto. The basic processing unit 11 comprises a mobile main frame assembly 13 having a transverse axle beam 14 supported by ground wheels 15. The hay pickup unit 12 includes a tine pickup mechanism 16 which delivers crops rearwardly to a transverse auger 17 which moves the crops to the center from both sides whereat the crops are fed rearwardly by fingers 18 through discharge opening 19 to the basic unit 11. Pivotally mounted to the frame assembly 13 is a fore-and-aft extending hitching tongue 20 which attaches at its forward end 21 to the drawbar of a tractor (not shown). Mounted on the right side of the frame assembly 13 is a fore-and-aft extending housing 25 including transversely spaced side walls 24 having a forwardly facing crop receiving opening 26. Disposed within the housing 25 are a rotary reel cutterhead 28 and pairs of opposed upper and lower feed rolls 27, 29 disposed forwardly thereof, the feed rolls 27, 29 being transversely elongated substantially the entire width of the housing 25 and defining therebetween a crop passage through which crops are fed to the cutterhead 28 whereat the crops are chopped and conveyed by a suitable mechanism to a spout whereat they are expelled from the forage harvester. The pulling tractor supplies mechanical, electrical, and hydraulic power for operating and controlling the various components. A pair of brackets 30 are welded to the transverse axle beam 14, one on each side of the housing 25 outwardly thereof. The brackets 30 extend forwardly and upwardly of the axle beam 14 to a point whereat they received transverse pivot pins 31 in axial alignment to form a fixed transverse horizontal pivot axis located forwardly adjacent the nip of the feed rolls 27, 29, the fixed pivot axis being the line of articulation between the basic unit 11 and the gathering unit 12 during operation of the forage harvester 10 in the field. Mounted on the pivot pins 31 are laterally spaced legs 35 of an attaching yoke 36 having a planar frame of inverted U-shape. The distal ends of the legs 35 are interconnected by a radially outwardly extending transversely elongated U-shaped cradle 37 which receives a transverse pipe 39 extending across the upper portion of the crop feeding unit 12 above its rear discharge opening 19, the rearward portion of the crop feeding unit 12 abutting against the yoke 36 and being retained there by pins 41 as shown in FIG. 4. Control means including the cable 71 attached to the yoke 36 control the yoke and allow it to pivot forwardly about the pivot pins 31 between a lowered forward position for picking up the crop feeding unit 12 and raised positions, such as shown in FIG. 1, for operation. All of the above has been previously described in considerably greater detail in the referenced copending application, Ser. No. 698,372, which is incorporated herein by reference. Those interested in the construction of the yoke 36 and its control means as well as the operation thereof should consult the referenced copending application.

In accordance with the invention, a pair of sheet metal throat sheets 46 are attached as by bolts respectively to the forward side of each of the legs 35 of the yoke 36, as may be seen in FIGS. 3 and 4. From the legs 35 the throat sheets 46 have a transversely inwardly extending portion 57 terminating in rearwardly turned ends 58 which extend inwardly adjacent the side walls 24 between the ends of the feed rolls 27, 29 and the side walls. A generous radius is provided between the transverse portions 47 and the rearwardly turned ends 48 to improve crop flow in this area. Since the yoke swings away from the housing 25, as described above, the rearwardly turned ends 58 should overlap the forward ends of the housing walls 24 enough that the sides of the crop passage in the area between the feed rolls 27, 29 are closed in all operating positions of the crop feeding unit 12. The upward extent of the turned ends 58 of the throat sheets 46 includes at least the crop passage between the feed rolls 27, 29, bearing in mind that, as in common on forage harvesters, the upper feed rolls 27 are permitted to move vertically to increase the height of the crop passage therebetween as the quantity of crops increases. Preferably the throat sheets 46 extend upwardly from below the axis of the lower feed roll 29 to the cradle cross member 37 of the yoke 36.

Viewing FIG. 2, it will be seen that the uppermost portion 59 of the rear discharge opening 19 in the backsheet 60 of the crop feeding unit 12 is slightly wider than the yoke 36 in order to accommodate the cradle 37. Therebelow, the edges 61 of the discharge opening 19 taper inwardly to a somewhat narrower discharge opening in the lower portion 62 (FIG. 4) of the discharge opening 19 where most of the crops pass so that the back sheet 60 partially overlaps the yoke 36 and throat sheets 46 in this area. Thus when a crop unit 12 is attached to the yoke 36, throat sheets 46 close off substantially all portions of the discharge opening 19 laterally external of the feed roll housing opening 26 with the exception of the small slots created by the clearance in the upper portion 59 of the discharge opening for the yoke cradle 37. These are inconsequential since there is little or no crop flow in this area.

It can be seen from FIG. 4, that the transverse width of the lower portion 62 of the discharge opening 19 of the crop feeding unit is considerably wider than the opening 26 of the feed roll housing 25. Thus the same crop feeding unit could be used even if the housing opening 26 and feed rolls 27, 29 were considerably wider, as in a basic processing unit of a larger capacity, as long as the mounting of the yoke legs 35 is not changed. The transverse extent of the throat sheets 46 in such a larger capacity basic unit would of course be less.

It will further be seen that since the throat sheets 46 move with the yoke 36 as it swings away from the housing 25, they are always in confronting relation with the gathering unit 12 while the rearwardly turned ends 58 will continue to overlap the housing 25, maintaining the side sealing of the crop passage.

Thus, there has been provided in accordance with the invention a forage harvester throat sheet apparatus that fully satisfies the objects, and advantages mentioned above. In the light of the foregoing description it is evident that certain modifications and variations will become apparent to those of ordinary skill in the art. Accordingly it is intended to embrace all such modifications that may fall within the scope of the appended claims.

What is claimed is:
1. A forage harvester comprising:
 a basic processing unit including:
  a mobile frame;
  a crop processing unit mounted on said frame including a cutterhead disposed for rotation about a transverse axis and a plurality of opposed transversely elongated crop infeed rolls disposed forwardly thereof and defining a crop feeding passage therebetween;
  a feed roll housing including transversely spaced fore-and-aft extending sidewalls disposed adjacent the respective ends of said feed rolls, said side walls terminating at a forwardly facing crop receiving opening; and a pair of shield members mounted on said basic processing unit for fore-and-aft swinging movement relative to said feed roll housing and disposed adjacent said forwardly facing opening respectively on each side thereof, said shield members having an upward extent at least equal to said crop feeding passage, said shields extending laterally outwardly from rearwardly turned inner ends disposed inwardly adjacent said sidewalls to outward ends substantially spaced from the side walls;

and a crop feeding unit detachably mounted to said basic unit forwardly of said shields and in confronting relationship thereto, said crop unit having a rear crop discharge opening having a transverse width greater than that of said infeed housing opening.

2. The invention in accordance with claim 1 and said crop feeding unit comprising a hay pickup.

3. A forage harvester-crop feeding unit combination comprising:

a mobile frame, a crop processing unit mounted on said frame including a cutterhead disposed for rotation about a transverse axis and a plurality of opposed transversely elongated crop infeed rolls disposed forwardly thereof and defining a crop feeding passage therebetween;

a feed roll housing including transversely spaced fore-and-aft extending side walls disposed adjacent the respective ends of said feed rolls, said side walls terminating at a forwardly facing open end;

an attaching yoke pivotally mounted about a transverse axis to said frame adjacent said forward facing open end, said yoke including transversely spaced side legs disposed laterally outwardly of said open end and having a cross member extending between said legs;

a pair of shield members mounted respectively to each of said legs and extending laterally inwardly therefrom to rearwardly turned ends disposed laterally inwardly adjacent said side walls, the inwardly turned ends of said shields having an upward extent equal to said crop feeding passage;

and a crop feeding unit attached to said yoke in confronting relationship to said shields and having a rear crop discharge opening for feeding crops to said processing unit, said side shields closing off the portion of said discharge opening laterally external of said open end of said housing.

4. The invention in accordance with claim 3 and the transverse extent of said opening being greater than that of said housing open end and less than the transverse width of said yoke.

* * * * *